H. B. MYER.

Gas Regulator.

No. 83,990.

Patented Nov. 10, 1868.

Witnesses:

Inventor:

HENRY B. MYER, OF PHILADELPHIA, PENNSYLVANIA.

Letters Patent No. 83,990, dated November 10, 1868.

IMPROVED REGULATING-GAS BURNER.

The Schedule referred to in these Letters Patent and making part of the same.

*To all whom it may concern:*

Be it known that I, HENRY B. MYER, of Philadelphia, State of Pennsylvania, have invented a new and useful Improvement in Regulating-Gas Burners; and I do hereby declare the following to be a full and exact description of the same, reference being had to the annexed drawings, making part hereof, in which—

Figure 1:
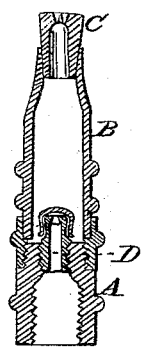

Figure 1 represents a vertical section of my burner suited to hold a shade.

Figure 2:
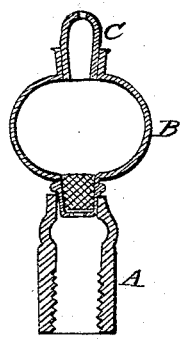

Figure 2, a vertical section of another form of my burner.

My invention consists in a gas-burner, having a metal base, a glass body, of any desirable form, and a tip, of stone, lava, or other material. Its chief advantage lies in its glass body having a small aperture at the bottom for regulating the flow of gas. This aperture possesses this feature: it is not subject, like the iron, or other metal burner, to corrosion, so that no matter how old the burner is, the regulating-aperture is always the same, and can be blown to burn two, three, four, five, or six, or any number of feet per hour, as required by the consumer.

At the bottom of the glass body, over the regulating-aperture, a roll or ball of fine wire or gauze, a piece of sponge, or other like material, may be placed, for breaking the force of the inflowing current of gas. The wire gauze, or other suitable material, in both figs. 1 and 2, is not always necessary, as that will be determined by the pressure of gas.

Instead of the small aperture in lower part of glass body, fig. 2, the bottom of said body may be left open, and a metal base or plate, with a small aperture, may be substituted, but I prefer the hole in the glass, as it is not corrosive.

To enable others skilled in the art to make and use my invention, I will describe its construction and operation.

In the drawings, A is the metal base, which may have a lower tip, covered with gauze, as in fig. 1, or merely have the glass body, with a small aperture, as shown in fig. 2, and described above.

B is the glass body, and C the tip, of stone, iron, or other material.

In case I use a lower tip, D, I surround the tip with wire gauze, or other suitable material, for modifying the force of the current of gas.

Having thus described my improvements,

What I claim, and desire to secure by Letters Patent, is—

1. The glass body B, fig. 2, having a small aperture in its bottom, in the manner and for the purposes set forth.

2. The glass body B, with its small aperture at the bottom, for gauging the gas, in combination with the metallic base A, and lava or other non-metallic tip C, all constructed and arranged as and for the purpose specified.

3. In combination with the above-described burner, the wire gauze or other fibrous valve, resting upon the small aperture, at the base of the glass body B, as and for the purpose set forth.

H. B. MYER.

Witnesses:
W. A. A. McKINLEY,
WM. J. BURNS.